US008917872B2

(12) United States Patent
Li et al.

(10) Patent No.: US 8,917,872 B2
(45) Date of Patent: Dec. 23, 2014

(54) ENCRYPTION KEY STORAGE WITH KEY FRAGMENT STORES

(75) Inventors: Jun Li, Mountain View, CA (US); Ram Swaminathan, Cupertino, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 633 days.

(21) Appl. No.: 13/177,228

(22) Filed: Jul. 6, 2011

(65) Prior Publication Data

US 2013/0010966 A1    Jan. 10, 2013

(51) Int. Cl.
H04L 9/08    (2006.01)
(52) U.S. Cl.
CPC .............. *H04L 9/085* (2013.01); *H04L 9/0888* (2013.01)
USPC ............................ 380/278; 380/277; 707/747
(58) Field of Classification Search
CPC ............................... H04L 9/085; H04L 9/0888
USPC ..................................... 380/277–278; 707/747
See application file for complete search history.

(56) References Cited

U.S. PATENT DOCUMENTS

| 5,764,767 | A * | 6/1998 | Beimel et al. ................. 713/180 |
| 7,864,958 | B2 | 1/2011 | Harrison et al. |
| 2003/0147535 | A1* | 8/2003 | Nadooshan et al. .......... 380/277 |
| 2004/0143743 | A1* | 7/2004 | Margolus et al. ............. 713/176 |
| 2008/0285754 | A1 | 11/2008 | Kezmann |
| 2009/0323970 | A1* | 12/2009 | Cerruti et al. ................. 380/281 |
| 2010/0037056 | A1* | 2/2010 | Follis et al. .................... 713/171 |
| 2010/0054481 | A1* | 3/2010 | Jajodia et al. ................. 380/284 |
| 2011/0029809 | A1* | 2/2011 | Dhuse et al. ....................... 714/6 |
| 2011/0289366 | A1* | 11/2011 | Baptist et al. .................... 714/54 |
| 2011/0289378 | A1* | 11/2011 | Grube et al. .................. 714/760 |
| 2012/0311345 | A1* | 12/2012 | Dhuse et al. .................. 713/189 |
| 2013/0275746 | A1* | 10/2013 | Gladwin et al. .............. 713/153 |
| 2013/0311851 | A1* | 11/2013 | Cilfone et al. ................ 714/763 |
| 2014/0195809 | A1* | 7/2014 | Solow et al. .................. 713/171 |

FOREIGN PATENT DOCUMENTS

| CN | 101335616 | 12/2008 |
| CN | 101582760 | 11/2009 |
| WO | WO2004012378 | 2/2004 |
| WO | WO2009100679 | 8/2009 |

OTHER PUBLICATIONS

Shamir, "How to share a secret", Communications of the ACM, vol. 22, No. 11, p. 162-613 (Nov. 1979).*

(Continued)

*Primary Examiner* — Jung Kim
*Assistant Examiner* — Theodore Parsons

(57) ABSTRACT

Systems, methods, and machine-readable and executable instructions are provided for encryption key storage. Encryption key storage may include associating each of a plurality of identifiers with a different one of a plurality of key fragment stores, determining a plurality of indexes, where each of the plurality of indexes is based upon a handle provided by a customer, an authorization token provided by the customer, and a different one of the plurality of identifiers, partitioning an encryption key provided by the customer into a number of encryption key fragments, and distributing the plurality of indexes and the number of encryption key fragments to the plurality of key fragment stores. The handle can be a uniform resource identifier, for instance.

13 Claims, 4 Drawing Sheets

(56) References Cited

OTHER PUBLICATIONS

Litwin et al., "LH*—a scalable distributed data structure", ACM Transactions on Database Systems, vol. 21, Issue 4, pp. 480-525 (Dec. 1996).*

Jajodia, Litwin, Schwarz, "LH*RE A Scalable Distributed Data Structure with Recoverable Encryption", Research Report CERIA-CSIS-SCU (Dec. 2009).*

Unknown., "Encryption Key Management" PCT Application No. PCT/US2010/045768, filed Aug. 17, 2010, 43 pages.

* cited by examiner

ENCRYPTION KEY STORAGE WITH KEY FRAGMENT STORES

BACKGROUND

On-line applications and services may store and/or access data. Some data may be sensitive and it may be desirable to keep that data secure. In order to keep such sensitive data secure, on-line applications and services may store sensitive data in an encrypted format.

Cryptographic algorithms may use encryption keys to encrypt data. Specifically, an encryption key may determine the functional output of a cryptographic algorithm. As such, an encryption key may be used to transform a piece of data from an unencrypted format into an encrypted format. Likewise, the encryption key may be used to transform the piece of data from its encrypted format back to its unencrypted format.

DETAILED DESCRIPTION

Figure 1:
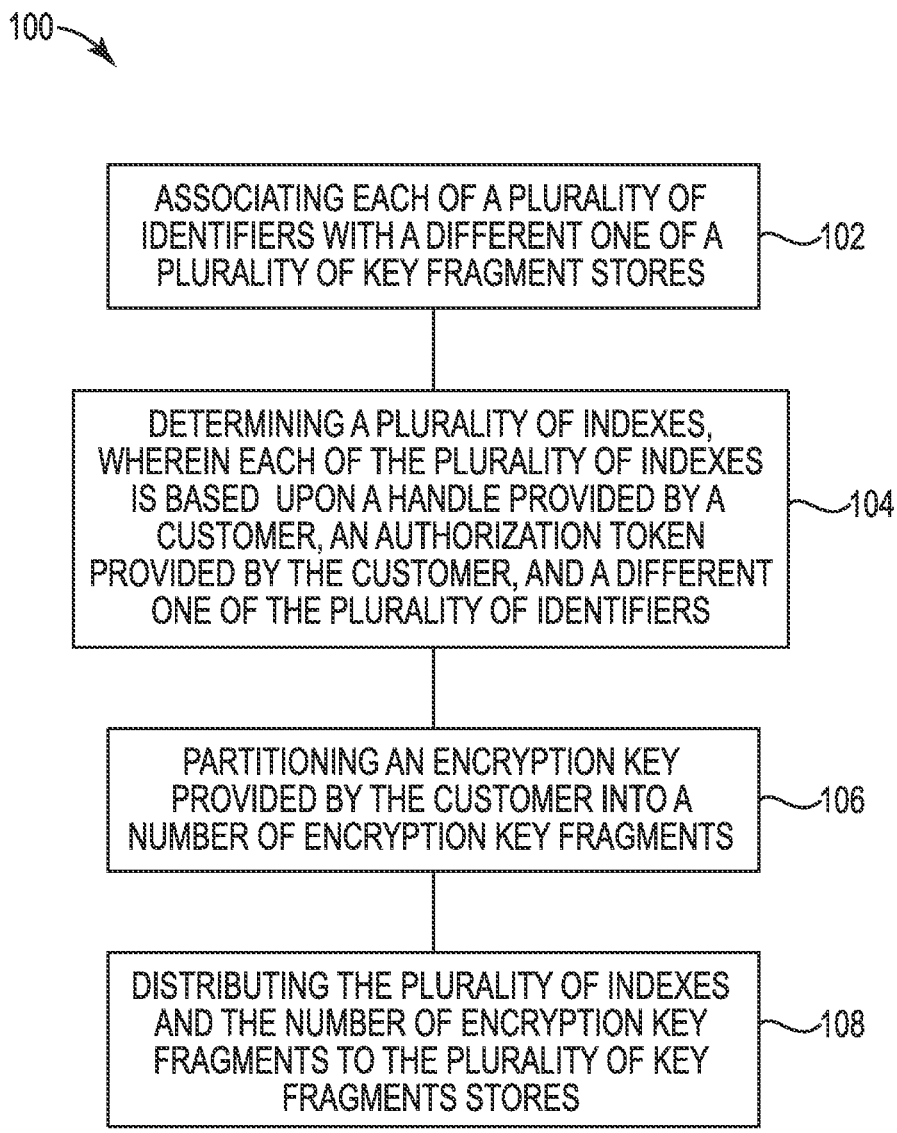
FIG. 1 is a flow chart illustrating an example of a method for encryption key storage according to the present disclosure.

Examples of the present disclosure may include methods, systems, and machine-readable and executable instructions and/or logic. An example method for encryption key storage may include associating each of a plurality of identifiers with a different one of a plurality of key fragment stores, determining a plurality of indexes, wherein each of the plurality of indexes is based upon a handle provided by a customer, an authorization token provided by the customer, and a different one of the plurality of identifiers, partitioning an encryption key provided by the customer into a number of encryption key fragments, and distributing the plurality of indexes and the number of encryption key fragments to the plurality of key fragment stores.

Encryption is a form of security that transfers information, images, programs, or other data into an encrypted form by applying a set of algorithms to the original material. These algorithms can transfer data into streams or blocks of seemingly random alphanumeric characters.

An encryption key may be employed to encrypt data, decrypt data, authenticate requests, or authorize requests. Cloud-based computing models can be useful for systems, methods, and services that can manage encryption keys, e.g. encryption key storage, in multi-tenant cloud environments.

Examples of the present disclosure may help to provide a greater availability of an encryption key, as compared to other systems and methods. Additionally, examples of the present disclosure may help to provide an increased resistance to internal collusion attacks, as compared to other systems and methods, among other benefits.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 216 may reference element "16" in FIG. 2, and a similar element may be referenced as 316 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, the designators "k", "m", "n", "N," "M," "P," and "Q," indicate that a number of the particular feature so designated can be included with examples of the present disclosure. As used herein, "a number of" something can refer to a number of such things.

In a multi-tenant cloud environment a cloud service provider may have numerous, e.g., millions, of clients. Each of these clients may utilize thousands of encryption keys. Additionally, cloud environments may include many machines. For example, a cloud environment may include thousands or even hundreds of thousands of machines.

FIG. 1 is a flow chart illustrating an example of a method 100 for encryption key storage according to the present disclosure. At 102, each of a plurality of identifiers is associated with a different one of a plurality of key fragment stores. Examples of the key fragment store include, but are not limited to, Cassandra and HBase. Both Cassandra and HBase are open source, non-relational, distributed data management systems for structured data.

Examples of the present disclosure provide that additional key fragment stores may be employed, thus providing scalability. For example, additional key fragment stores may be employed to accommodate additional clients in a multi-tenant cloud environment, a greater storage demand from existing clients, or a combination thereof.

Each key fragment store is associated with a identifier, $v_i$. Each identifier is unique to a particular key fragment store. As discussed herein, the unique identifiers may be unconcealed. For example, the unique identifiers may be known by multiple tenants, i.e. customers, in a multi-tenant cloud environment and an encryption key storage provider.

At 104, a plurality of indexes are determined, wherein each of the plurality of indexes is based upon a handle provided by a customer, an authorization token provided by the customer, and a different one of the plurality of identifiers, each of which is associated with a different one of a plurality of key fragment stores.

Each encryption key to be stored is associated with a customer specified handle, such as a uniform resource identifier, $uri_j$. The handle may function as a locator that indicates where a resource, e.g. an encryption key, is located in the encryption key storage and serve as a mechanism for retrieving the resource.

Additionally, each encryption key to be stored is associated with an authorization token, $uid_c$, provided by the customer. Examples of the present disclosure provide that the authorization token is secret. In other words, the authorization token is known only to a particular customer. The authorization token may be associated with a plurality of encryption keys that belong to a customer. The association between the authorization token and the encryption key(s) is only known to the particular customer.

The plurality of indexes are determined by applying a first hashing algorithm to a combination of the handle provided by the customer and the authorization token provided by the customer to generate a first uniquely coded value. Applying a first hashing algorithm to a combination of the handle provided by the customer and the authorization token provided by the customer may be represented as $H(uri_i+uid_c)$.

After the first uniquely coded value is generated a second hashing algorithm is applied to a combination of the first uniquely coded value and one of the plurality of identifiers to determine the plurality of indexes. Applying the second hashing algorithm to a combination of the first uniquely coded value and one of the plurality of identifiers may be represented as $H(H(uri_i+uid_c)+v_j)$.

Examples of the present disclosure provide that the first hashing algorithm and the second hashing algorithm can be the same hashing algorithm. Examples of the present disclosure provide that the first hashing algorithm and the second hashing algorithm can be different hashing algorithms.

Examples of the present disclosure provide that the hashing algorithm is a cryptographically strong trapdoor function. The cryptographically strong trapdoor function is a one-way function. A one-way function is hard to invert, i.e. cryptographically strong, unless some secret information, called the trapdoor, is known. Properties of the hashing algorithm include, but are not limited to: provided a hashing algorithm H, then given $H(x)$, x is not guessable; and given $x \neq y$, $H(x) \neq H(y)$ with very high probability. Examples of the hashing algorithm include, but are not limited to, SHA-0, SHA-1, SHA-256/224, SHA 512/384, GOST, NAVAL, MD2, MD4, MD5, PANAMA, and RIPEMD.

At 106, an encryption key provided by the customer is partitioned into a number of encryption key fragments. Given a tuple $<uri_i, key_i>$ where $uri_i$ is the handle and $key_i$ is an encryption key, the encryption key is partitioned into a first number, n of encryption key fragments. Examples of the present disclosure provide that the encryption key is partitioned with a cryptographic algorithm referred to as Shamir's secret sharing algorithm.

Employing Shamir's secret sharing algorithm, an encryption key is partitioned into the first number, n of encryption key fragments by a polynomial: $f_i(x)=a_{0,i}+a_{1,i}x+a_{2,i}x^2+\ldots+a_{k-1,i}x^{k-1}$, where $k>1$, $a_{0,i}=key_i$, and $\{a_{1,i},\ldots,a_{k-1,i}\}$ is a set of random coefficients. The polynomial $f_i(x)$ is evaluated at $n>k$ points $x_j$, where $j=1,\ldots n$ to construct encryption key fragments $F_{i,j}=(x_j, f_i(x_j))$, as a set of points on the polynomial. Given any k of the encryption key fragments, $F_{i,j}=(x_j, f_i(x_j))$, the coefficients of the polynomial can be obtained by Lagrange interpolation to reconstruct the encryption key, $a_{0,i}=key_i$. The encryption key, $a_{0,i}=key_i$, cannot be reconstructed if fewer than k of the encryption key fragments are obtained.

Employing Shamir's secret sharing algorithm in partitioning an encryption key can help to provide protection against data loss. Because only k of n encryption key fragments are necessary to reconstruct the encryption key, if some encryption key fragments are missing or corrupted it may still be possible to reconstruct an encryption key.

Employing Shamir's secret sharing algorithm in partitioning an encryption key can help provide information theoretic security. Because at least k encryption key fragments are necessary to reconstruct the encryption key, if an intruder has obtained fewer than k encryption key fragments it is theoretically impossible for the intruder to reconstruct the encryption key. Also, the intruder would need to corrupt at least n−k+1 of the encryption key fragments to make the encryption key unreconstructable.

Additionally, employing Shamir's secret sharing algorithm in partitioning an encryption key can help eliminate a need to maintain a master key. As discussed, $\{a_{1,i},\ldots,a_{k-1,i}\}$ is a set of random coefficients, and as such need not be retained.

At 108, the plurality of indexes and the number of encryption key fragments are distributed to the plurality of key fragment stores. The plurality of indexes and the number of encryption key fragments may be represented as a respective tuple $<L_{i,j}, F_{i,j}>$, where $L_{i,j}=H(H(uri_i+uid_c)+v_j)$ and $F_{i,j}=(x_j, f_i(x_j))$. A respective tuple, corresponding to a particular $v_j$, is distributed to the key fragment store corresponding to the particular $v_j$.

By including the identifier $v_j$ corresponding to the particular key fragment store in the index, every key fragment store will maintain a different index for the corresponding encryption key fragments. Maintaining a different index for the corresponding encryption key fragments can help provide that if an intruder is able to access each of the plurality of key fragment stores the intruder will be unable to correlate the encryption key fragments corresponding to a particular encryption key.

Additionally, including the authorization token provided by the customer in each of the plurality of indexes helps remove a possibility of locating or correlating the number of encryption key fragments solely by employing the customer specified handle. As such, handle construction and maintenance resources may be reduced, because unlike other systems, examples of the present disclosure do not need the customer specified handle to be a secret.

Examples of the present disclosure provide that neither the customer specified handle nor the authorization token provided by the customer are maintained within the encryption key storage after the key fragments have been successfully stored. This helps to provide that an entity other than the customer that has provided the authorization token can not successfully formulate a request to the plurality of key fragment stores to retrieve the number of encryption key fragments, reconstruct the encryption key, and associate the handle with the customer. Because of this the plurality of key fragment stores may operate without either specialized maintenance or access permissions. Further, the plurality of key fragment stores may operate in a multi-tenant cloud environment, for example having shared storage.

As examples of the present disclosure may be employed in a multi-tenant cloud environment each of the multi-tenants may have access to the plurality of key fragment stores. However, only a customer knowing both the handle provided by the customer and the authorization token provided by the customer can present a combination of the handle and the authorization token to retrieve the number of encryption key fragments and reconstruct the encryption key.

Examples of the present disclosure provide that a customer provides and receives information via secured channel. As discussed, the encryption key is partitioned into the first number n of encryption key fragments of which only k of n encryption key fragments are necessary to reconstruct the encryption key. Examples of the present disclosure may ensure that of the first number n of encryption key fragments at least the second number k of encryption key fragments are stored in the number k of the plurality of key fragment stores before closing a secured channel between the customer and a provider of the encryption key storage, wherein n is greater than k. Ensuring that k encryption key fragments are stored before closing the secured channel can help prevent a loss of an encryption key. Examples of the present disclosure provide, to help ensure high reliability of the encryption key storage, the actual number of encryption key fragments, m, to be stored before closing the secured channel should be higher than k, that is, m is greater than k.

If a particular key fragment store is unavailable when distributing the plurality of indexes and the number of encryption key fragments, the index and encryption key fragment destined for the unavailable key fragment store may be distributed to a replacement key fragment store. A transfer marker may be associated with the index and the encryption key fragment to mark it as a guest fragment and record its location in the replacement key fragment store.

Examples of the present disclosure provide the plurality of key fragment stores is scanned to identify a guest fragment. A retry protocol may be employed to transfer the guest fragment form the replacement key fragment store to an original destination, i.e. the particular key fragment store that was previously unavailable. After the guest fragment has been transferred from the replacement key fragment store to the original destination the guest fragment may be deleted from the replacement key fragment store.

As discussed, examples of the present disclosure include the plurality of key fragment stores. Information may be sent to and received from the plurality of key fragment stores via a secured channel.

Each of the plurality of key fragment stores may be implemented as one or more computing devices, e.g. personal computers, general purpose computers, servers, mainframe computers, and/or combinations thereof. Each of the plurality of key fragment stores may be physically separated from each other, in some cases by large distances, such as hundreds of miles or even thousands of miles.

Examples of the present disclosure provide that a region, which includes a plurality of key fragment stores, may be designated as a home region. The home region may correspond to a customer request for encryption key storage. For example, if a customer request is received from an East-Coast region, then the East-Coast region may be designated as the home region. Other regions not designated as the home region but which include at least a plurality of key fragment stores may be designated as fallback regions.

Examples of the present disclosure provide that at least k encryption key fragments are stored in the home region. Storing at least k encryption key fragments in the home region may help provide that a performance threshold is achieved and maintained. For example, during non-fault conditions where there is home region availability, k encryption key fragments may be retrieved from the home region to reconstruct the encryption key.

Examples of the present disclosure provide that at least k encryption key fragments are stored in the fallback regions. For example, during fault conditions, such as when the home region is unavailable, k encryption key fragments may be retrieved from the fallback regions to reconstruct the encryption key Examples of the present disclosure provide that within the particular regions encryption key fragments are distributed to a variety of different availability zones. Examples of the present disclosure provide that encryption key fragments are uniformly distributed across the availability zones of a particular region.

Examples of the present disclosure employ a replication protocol to reconstruct a lost encryption key fragment within one of the plurality of key fragment stores. For example, as discussed an examples of the key fragment store include, but are not limited to, Cassandra and HBase.

Cassandra is an open source distributed data store that can store structured data, e.g. the encryption key fragments as discussed herein, using multiple replicas within a cluster of machines. The number of multiple replicas is configurable. Examples of the present disclosure may employ 2, 3, 4 or even more replicas. For replica synchronization, Cassandra uses an anti-entropy protocol. The anti-entropy protocol allows a machine to compare data stored on that machine to with its replicas stored on other machines. If it is found that one or more replicas is missing, the missing replicas can be copied to another machine. This anti-entropy protocol can help provide that, over time, enough data replicas are maintained in the data store.

HBase is an open source, non-relational, distributed data store modeled after Google's BigTable. HBase runs on top of Hadoop Distributed File System (HDFS) to hold the on-disk data structures that represent the structured data stored in the distributed data store. The HDFS has a data assurance protocol to help ensure that data in HDFS is reliably stored. Therefore, HBase relies on HDFS to help provide that, over time, the managed structured data is stored reliably.

Figure 2:
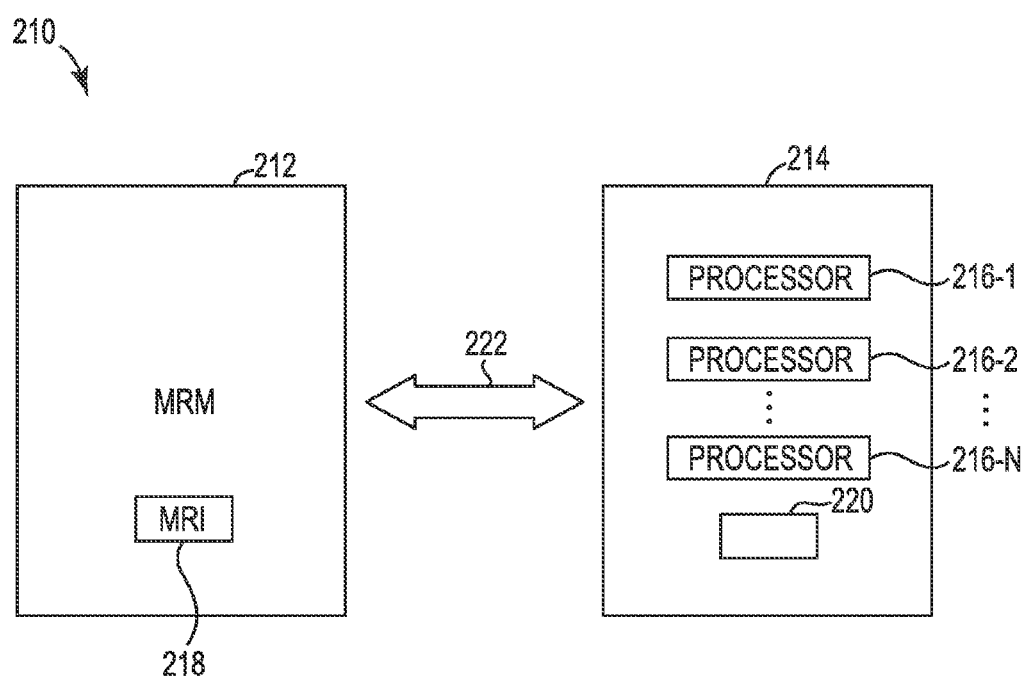
FIG. 2 illustrates a block diagram of an example of a machine-readable medium in communication with processing resources for encryption key storage according to the present disclosure.

FIG. 2 illustrates a block diagram of an example of a machine-readable medium in communication with processing resources for encryption key storage according to the present disclosure. As illustrated in FIG. 2, a machine-readable medium (MRM) 212 is in communication with a computing device 214, e.g. a machine, having processor resources of more or fewer than 216-1, 216-2 . . . 216-N, that can be in communication with, and/or receive a tangible non-transitory machine-readable medium (MRM) 212 storing a set of machine readable instructions 218 executable by the machine to provide encryption key storage, as discussed herein. The computing device may include memory resources 220, and the processor resources 216-1, 216-2 . . . 216-N may be coupled to the memory resources 220. Examples of the present disclosure provide that a plurality of machines, such as computing device 214, is employed.

Processor resources can execute machine-readable instructions 218 that are stored on an internal or external non-transitory machine-readable medium 212. A non-transitory machine-readable medium, e.g., machine readable medium 212, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), flash memory, etc., as well as other types of machine-readable media.

The non-transitory machine-readable medium 212 can be integral, or communicatively coupled, to a computing device, in either in a wired or wireless manner. For example, the non-transitory machine-readable medium can be an internal memory, a portable memory, a portable disk, or a memory located internal to another computing resource, e.g., enabling the machine-readable instructions to be downloaded over the Internet.

The MRM 212 can be in communication with the processor resources, e.g., 216-1, 216-2 ... 216-N, via a communication path 222. The communication path 222 can be local or remote to a machine associated with the processor resources 216-1, 216-2 ... 216-N. Examples of a local communication path 222 can include an electronic bus internal to a machine such as a computer where the MRM 212 is one of volatile, non-volatile, fixed, and/or removable storage medium in communication with the processor resources, e.g., 216-1, 216-2 ... 216-N, via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 222 can be such that the MRM 212 is remote from the processor resources, e.g., 216-1, 216-2, ... 216-N, such as in the example of a network connection between the MRM 212 and the processor resources, e.g., 216-1, 216-2, ... 216-N. That is, the communication path 222 can be a network connection. Examples of such a network connection can include a local area network (LAN), a wide area network (WAN), a personal area network (PAN), and the Internet, among others. In such examples, the MRM 212 may be associated with a networked storage system that the computing device, as well as other computing devices, have access to.

In an example, the processor resources, e.g., of the plurality of machines, coupled to the memory can provide encryption key storage, as discussed herein. An encryption key provided by a customer may be received. A plurality of identifiers, where each of the plurality of identifiers is individually associated with a different one of a plurality of key fragment stores may be determined. A first hashing algorithm may be applied to a combination of a handle provided by a customer and an authorization token provided by the customer to generate a first uniquely coded value. A second hashing algorithm may be applied to a combination of the first uniquely coded value and individually each of the plurality of identifiers to provide a plurality of indexes. The encryption key may be partitioned into a number of encryption key fragments with Shamir's secret sharing algorithm. One of the plurality of indexes and one of the number of encryption key fragments may be distributed to a respective key fragment store of the plurality of key fragment stores such that each of the plurality of indexes and each of the number of encryption key fragments are distributed. The distributed number of encryption key fragments may be stored in a number of the plurality of key fragment stores. The handle and the authorization token may be received from the customer to retrieve encryption key fragments. The encryption key may be reconstructed from the retrieved encryption key fragments. The reconstructed encryption key may be provided to the customer.

Figure 3:
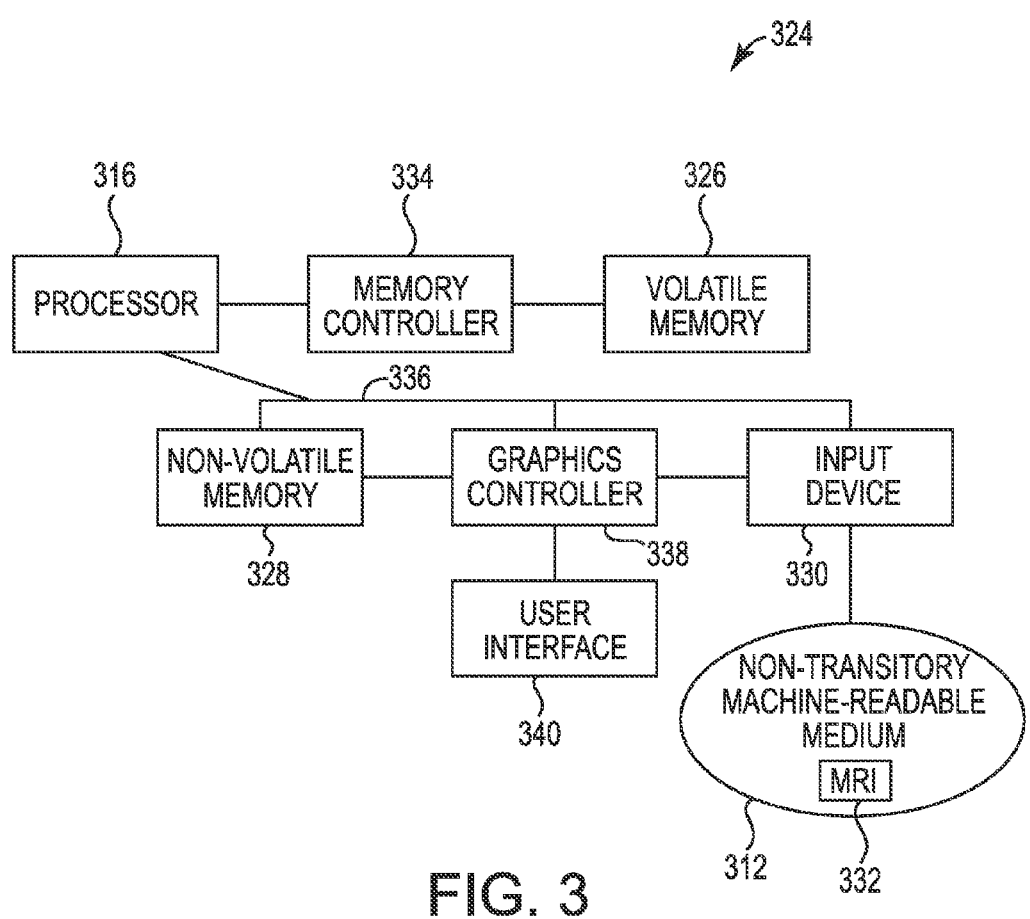
FIG. 3 illustrates a block diagram of an example of a portion of a computing system for encryption key storage according to the present disclosure.

FIG. 3 illustrates a block diagram of an example of a portion of a computing system 324 for encryption key storage according to the present disclosure. However, examples of the present disclosure are not limited to a particular computing system configuration. The system 324 can include processor resources 316 and memory resources, e.g., volatile memory 326 and/or non-volatile memory 328, for executing instructions stored in a tangible non-transitory medium, e.g., volatile memory 326, non-volatile memory 328, and/or machine-readable medium 312, and/or an application specific integrated circuit (ASIC) including logic configured to perform various examples of the present disclosure. A computer, e.g., a computing device, can include and/or receive a tangible non-transitory machine-readable medium 312 storing a set of machine-readable instructions 332, e.g., software, via an input device 330. As used herein, processor resources 316 can include one or a plurality of processors such as in a parallel processing system. Memory resources can include memory addressable by the processor resources 316 for execution of computer-readable instructions. The machine-readable medium 312 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 328 can be a database including a plurality of physical non-volatile memory devices. In various examples, the database can be local to a particular system or remote, e.g., including a plurality of non-volatile memory devices 328. A computing device having processor resources can be in communication with, and/or receive a tangible non-transitory machine-readable medium storing a set of machine-readable instructions 332, e.g., software, for encryption key storage, as described herein.

The processor resources 316 can control the overall operation of the system 324. The processor resources 316 can be connected to a memory controller 334, which can read and/or write data from and/or to the memory, e.g., RAM. The memory controller 334 can include an ASIC and/or a processor with its own memory resources, e.g., volatile and/or non-volatile memory. The memory can include one or a plurality of memory modules, e.g., chips.

The processor resources 316 can be connected to a bus 336 to provide for communication between the processor resources 316, and other portions of the system 324. A graphics controller 338 can connect to a user interface 340, which can provide an image to a user based on activities performed by the system 324.

In an example, the computing system may provide encryption key storage, as discussed herein. The computing system may associate each of a plurality of identifiers with a different one of a plurality of key fragment stores. The computing system may determine a plurality of indexes, where each of the plurality of indexes is based upon a handle provided by a customer, an authorization token provided the customer, and a different one of the plurality of identifiers, where the authorization token is unknown to an encryption key storage provider. The computing system may partition an encryption key provided by the customer into a first number, n, number of encryption key fragments with Shamir's secret sharing, where the encryption key is unobtainable without a second number, k, of the number of encryption key fragments such that n is greater than k. The computing system may distribute the plurality of indexes and the number of encryption key fragments to the plurality of key fragment stores such that at least k encryption key fragments are distributed to a first geographic region and at least k encryption key fragments are distributed one or more other geographic regions.

Figure 4:
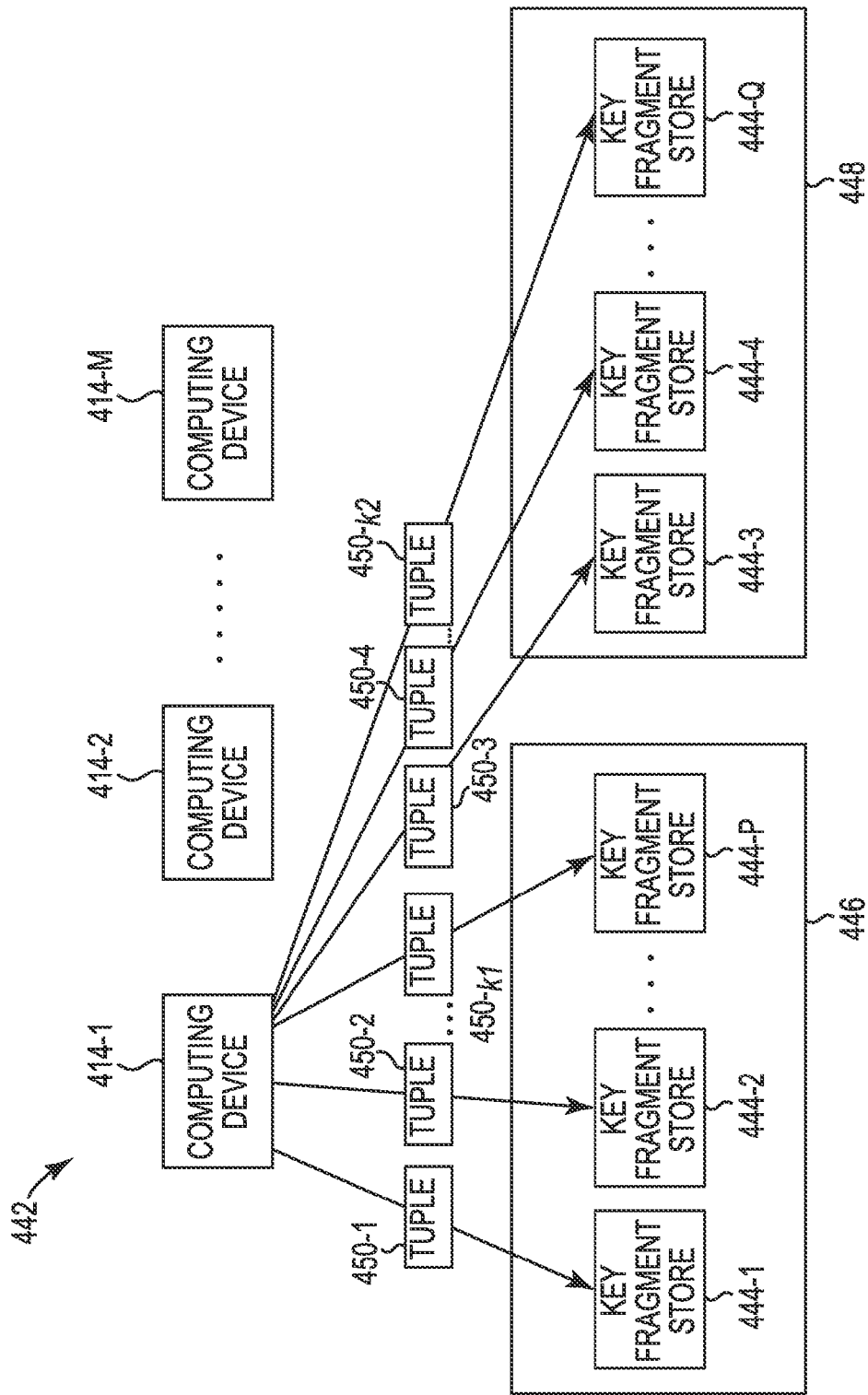
FIG. 4 illustrates a block diagram of an example of a portion of a computing system for encryption key storage according to the present disclosure.

FIG. 4 illustrates a block diagram of an example of a portion of a computing system 442 for encryption key storage according to the present disclosure. The computing system 442 includes the plurality of computing devices 414-1, 414-2 ... 414-M, a plurality of key fragment stores 444-1, 444-2 ... 444-P in the home region 446, and a plurality of key fragment stores 444-3, 444-4, ... 444-Q in the fallback region 448.

As discussed, examples of the present disclosure provide that the respective tuples 450-1, 450-2 ... 450-$k_1$ and 450-3, 450-4 ... 450-$k_2$ are distributed to the corresponding key fragment stores, each of which corresponds to the particular $v_i$. As used herein, $k_1$ is equal to $k_2$, which is equal to k, such that each series, 450-1, 450-2 . . . 450-$k_1$ and 450-3, 450-4 . . . 450-$k_2$, have k elements.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A computer-implemented method for encryption key storage comprising:
   associating, using a microprocessor, each of a plurality of unconcealed identifiers with a different one of a plurality of key fragment stores;
   determining, using the microprocessor, a plurality of indexes, wherein each of the plurality of indexes is based upon a handle provided by a customer, an authorization token provided by the customer, and a different one of the plurality of unconcealed identifiers, wherein each of the plurality of indexes is determined by applying a first hashing algorithm to a combination of the handle provided by the customer and the authorization token provided by the customer to generate a first uniquely coded value and applying a second hashing algorithm to a combination of the first uniquely coded value and one of the plurality of unconcealed identifiers;
   partitioning, using the microprocessor, an encryption key provided by the customer into a number of encryption key fragments; and
   distributing, using the microprocessor, the plurality of indexes and the number of encryption key fragments to the plurality of key fragment stores, wherein each of the plurality of key fragment stores maintains a different index for corresponding encryption key fragments.

2. The method of claim 1 wherein the number of encryption key fragments is a first number, n, and the encryption key is unobtainable without a second number, k, of the number of encryption key fragments such that n is greater than k.

3. The method of claim 1 wherein the encryption key is partitioned with Shamir's secret sharing algorithm.

4. The method of claim 1 wherein distributing the plurality of indexes and the number of encryption key fragments includes distributing one or more of the plurality of indexes and one or more of the encryption key fragments to a particular key fragment store of the plurality of key fragment stores.

5. The method of claim 1 further comprising receiving the handle provided by a customer and the authorization token provided by the customer to retrieve a quantity of the number of encryption key fragments.

6. The method of claim 5 further comprising reconstructing the encryption key from the quantity of the number of encryption key fragments.

7. The method of claim 6 further comprising providing the reconstructed encryption key to the customer.

8. A machine-readable non-transitory medium storing a set of instructions for encryption key storage executable by a machine to cause the machine to:
   receive an encryption key provided by a customer;
   determine a plurality of unconcealed identifiers, where each of the plurality of unconcealed identifiers is individually associated with a different one of a plurality of key fragment stores;
   apply a first hashing algorithm to a combination of a handle provided by a customer and an authorization token provided by the customer to generate a first uniquely coded value;
   apply a second hashing algorithm to a combination of the first uniquely coded value and individually each of the plurality of unconcealed identifiers to provide a plurality of indexes;
   partition the encryption key into a number of encryption key fragments with Shamir's secret sharing algorithm; and
   distribute one of the plurality of indexes and one of the number of encryption key fragments to a respective key fragment store of the plurality of key fragment stores such that each of the plurality of indexes and each of the number of encryption key fragments are distributed, wherein each of the plurality of key fragment stores maintains a different index for corresponding encryption key fragments;
   store the distributed number of encryption key fragments in a number of the plurality of key fragment stores;
   receive the handle and the authorization token from the customer to retrieve encryption key fragments;
   reconstruct the encryption key from the retrieved encryption key fragments; and
   provide the reconstructed encryption key to the customer.

9. The machine-readable non-transitory medium of claim 8 including instructions executable by the machine to cause the machine to:
   ensure that of a first number n of encryption key fragments at least a second number k of encryption key fragments are stored in a number k of the plurality of key fragment stores before closing a secured channel between the customer and a provider of the encryption key storage, wherein n is greater than k.

10. The machine-readable non-transitory medium of claim 8 including instructions executable by the machine to cause the machine to:
    employ a replication protocol to reconstruct a lost encryption key fragment within one of the plurality of key fragment stores.

11. The machine-readable non-transitory medium of claim 8 including instructions executable by the machine to cause the machine to:
    distribute one of the plurality of indexes and one of the number of encryption key fragments to a replacement key fragment store due to unavailability of the respective key fragment store of the plurality of key fragment stores; and
    mark the one of the plurality of indexes and one of the number of encryption key fragments with a transfer marker to indicate it as a guest fragment and record its location in the replacement key fragment store.

12. The machine-readable non-transitory medium of claim 1 including instructions executable by the machine to cause the machine to:
    scan the plurality of key fragment stores to identify the guest fragment; and
    transfer the guest fragment from the replacement key fragment store to an original destination.

13. A computing system for encryption key storage, comprising:
    a computing device including:
    a memory;
    a processor coupled to the memory, to:
    associate each of a plurality of unconcealed identifiers with a different one of a plurality of key fragment stores;

determine a plurality of indexes, wherein each of the plurality of indexes is based upon a handle provided by a customer, an authorization token provided by the customer, and a different one of the plurality of unconcealed identifiers, wherein the authorization token is unknown to an encryption key storage provider, wherein each of the plurality of indexes is determined by applying a first hashing algorithm to a combination of the handle provided by the customer and the authorization token provided by the customer to generate a first uniquely coded value and applying a second hashing algorithm to a combination of the first uniquely coded value and one of the plurality of unconcealed identifiers;

partition an encryption key provided by the customer into a number of encryption key fragments; and distribute the plurality of indexes and the number of encryption key fragments to the plurality of key fragment stores, wherein each of the plurality of key fragment stores maintains a different index for corresponding encryption key fragments.

* * * * *

UNITED STATES PATENT AND TRADEMARK OFFICE
CERTIFICATE OF CORRECTION

PATENT NO.       : 8,917,872 B2
APPLICATION NO.  : 13/177228
DATED            : December 23, 2014
INVENTOR(S)      : Jun Li et al.

It is certified that error appears in the above-identified patent and that said Letters Patent is hereby corrected as shown below:

In the Claims

In column 10, line 55, in Claim 12, delete "1" and insert -- 11 --, therefor.

Signed and Sealed this
Fifth Day of May, 2015

Michelle K. Lee
*Director of the United States Patent and Trademark Office*